(12) United States Patent
Kahrger et al.

(10) Patent No.: US 12,084,289 B2
(45) Date of Patent: Sep. 10, 2024

(54) RUNNING RAIL AND CHASSIS FOR IDLER DIAGNOSTIC SYSTEM ON CONVEYORS

(71) Applicant: TAKRAF GmbH, Leipzig (DE)

(72) Inventors: Rainer Kahrger, Leipzig (DE); Jan Nowak, Leipzig (DE); Boris Freier, Leipzig (DE); Mario Dilefeld, Leipzig (DE)

(73) Assignee: TAKRAF GMBH, Leipzig (DE)

( * ) Notice: Subject to any disclaimer, the term of this patent is extended or adjusted under 35 U.S.C. 154(b) by 58 days.

(21) Appl. No.: 18/049,516

(22) Filed: Oct. 25, 2022

(65) Prior Publication Data
US 2023/0130479 A1   Apr. 27, 2023

(30) Foreign Application Priority Data

Oct. 27, 2021   (DE) ...................... 10 2021 128 034.6

(51) Int. Cl.
*B65G 43/02* (2006.01)
*B65G 15/00* (2006.01)
(Continued)

(52) U.S. Cl.
CPC ............. *B65G 43/02* (2013.01); *B65G 21/22* (2013.01); *B65G 39/02* (2013.01); *B65G 47/60* (2013.01); *B65G 15/00* (2013.01)

(58) Field of Classification Search
CPC ........ B65G 47/60; B65G 39/02; B65G 43/02; B65G 15/00; B65G 21/22; E01B 25/24
See application file for complete search history.

(56) References Cited

U.S. PATENT DOCUMENTS

| 8,260,574 B1 * | 9/2012 | Schuitema | B65G 47/844 |
| | | | 702/183 |
| 10,246,846 B2 | 4/2019 | Desmeules | |
| 2021/0331872 A1 * | 10/2021 | Kahrger | B65G 39/18 |

FOREIGN PATENT DOCUMENTS

| CN | 206417548 U | 8/2017 | |
| DE | 292208 A5 * | 10/1983 | ............... B66C 9/02 |

(Continued)

*Primary Examiner* — James R Bidwell
(74) *Attorney, Agent, or Firm* — Heslin Rothenberg Farley & Mesiti P.C.

(57) ABSTRACT

The invention relates to a rail system as a track for suitable running gears and also to the running gear for a carrier roller diagnostic system, wherein the rail system is formed from a closed profile or tube. The rail system according to the invention comprises at least one running rail (2), a multi-part track holder (1) and a holding element (14) which is arranged with a first region (A) in a running rail support (13) of the track holder (1) and is arranged with a second region (B) in the running rail (2) when the running rail (2) and the running rail support (13) are connected to one another in the longitudinal direction, wherein the second region (B) of the holding element (14) is arranged in a passage opening (21) of the running rail (2) or projects through it. The running gear (3) according to the invention has at least one two-roller system as a guide and drive system, and at least one chassis which receives and connects both roller systems, has connection options for sensor system carriers and/or the energy control module. The guide system is formed such that it surrounds the geometry of the track in such a way that it limits the kinematic degrees of freedom to one and, if necessary, omits the holding of the track. Thus, only one movement (forward/back) along the track is provided. The drive system is designed to move the chassis and all connected systems relative to the track.

11 Claims, 6 Drawing Sheets

Figure 1:
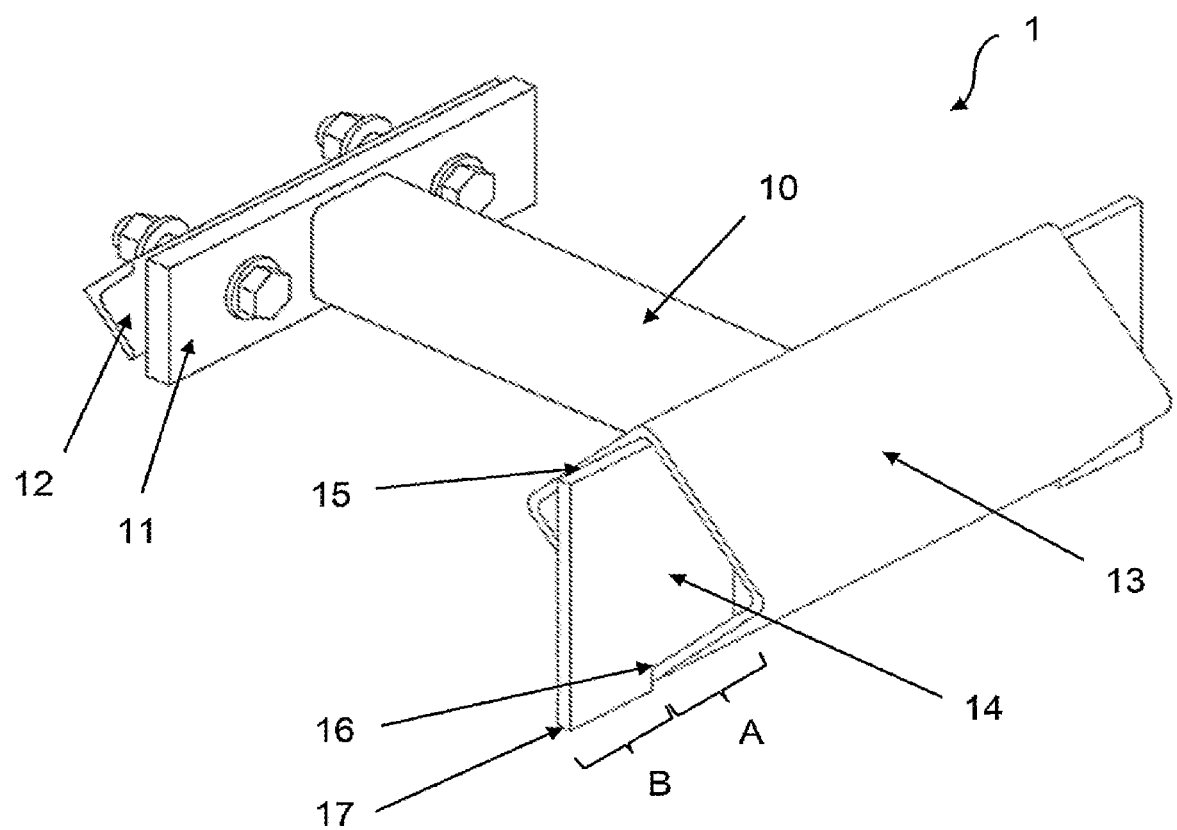

(51) Int. Cl.
    *B65G 21/22*     (2006.01)
    *B65G 39/02*     (2006.01)
    *B65G 47/60*     (2006.01)

(56) References Cited

FOREIGN PATENT DOCUMENTS

| | | |
|---|---|---|
| DE | 10 2021 109 792 A1 | 10/2021 |
| EP | 2828183 B1 | 3/2019 |
| EP | 3543179 A1 | 9/2019 |
| GB | 1045145 A | 10/1966 |
| JP | 5582366 B2 | 7/2014 |

\* cited by examiner

RUNNING RAIL AND CHASSIS FOR IDLER DIAGNOSTIC SYSTEM ON CONVEYORS

This application claims priority to German Application No. 10 2021 128 034.6, filed on Oct. 27, 2021, the entire contents of which are hereby incorporated by reference herein.

The invention relates to carrier roller diagnostic systems on conveyors, wherein these can be part of the supporting framework in the case of new deliveries or retrofit kits in the case of existing systems, wherein the focus is on a separate system at the conveyor and the suitability for harsh everyday operation, as well as the option for disassembly during maintenance work on the conveyor as the fundamental task.

Conveyors, such as conveyor loops, flat conveyors, transport belts or band conveyors and belt conveyors, are usually stationary conveyor systems which belong to the technical field of continuous conveyors.

Conveying and transport tasks in mining, in industry and over long distances, from above or below ground, have been performed using belt conveyors for decades. These belt conveyors are reliable transport systems which operate economically, very productively and in an environmentally friendly manner due to their low energy requirement.

The diagnostic systems known from the prior art are concerned with methods which inspect and evaluate the rotating parts of the conveyor systems (drives, drums, carrier rollers) or monitor the belt and its connection points.

Current self-propelled carrier roller maintenance and diagnostic systems run on rails laid on the ground or run on a belt cheek that is part of the existing belt frame. In addition, a separate running rail can be provided when the conveyor is installed or can be retrofitted to existing conveyors.

Systems which move on rails laid on the ground, as described in EP 2828183 B1, have a relatively high inherent mass, since they have to surround the conveyor with a gantry. The installation of the running rails represents an additional effort. Moving the diagnostic system on the belt cheek is possible only if this has already been taken into account during the construction of the conveyor and a continuous track has been created. The installation of a separate running rail remains as a light and cost-effective system.

Systems available on the market show weaknesses here with regard to simple dismantling during maintenance work on the conveyor and with regard to the rigidity that is necessary in order to ensure trouble-free operation of the diagnostic system.

These systems consist substantially of a vehicle that can accommodate various sensor systems and a running rail that extends along the conveyor or along the region to be monitored. Profiles such as T-profiles or L-profiles are usual as the running rail. Along the monitoring region, segments are welded or screwed to one another to form a continuous travel track.

The vehicle itself can be a compact unit or, similarly to a train system, can consist of a drive unit and coupled sensor units.

The sensor system comprises, for example, optical, thermal, acoustic, magnetic, mechanical, capacitive, piezoelectric, resistive and/or inductive sensors. If the increase in track distance is too great (approximately from 10°, corresponding to 0.175 rad), toothed racks can be arranged for support at these points, and it is furthermore possible to attach further drive units. The profiles can be arranged on both sides of the conveyor system in order to ensure the monitoring of all carrier rollers. The vehicle (system) should have mechanisms, such as roller guides, to prevent derailment. If necessary, the vehicle (system) can be equipped with a, "roof", which is intended to provide protection against transport material. If the vehicle (system) is battery-powered, "docking stations" are provided for charging the batteries/accumulators and transmitting the data on the route.

The disadvantage of the prior art is that, during maintenance work on the conveyor, the disassembly of the running rail is complicated. If the work is carried out laterally on the conveyor, the rail must be removed at this point in order to achieve better accessibility of the components to be serviced and to prevent deformations of the rail during the maintenance work. Depending on the length of the rail segments, numerous screws must be loosened for disassembly. During assembly, there is a great deal of effort involved in aligning the rail track.

Running rails formed of profiles according to the prior art additionally have the disadvantage that they have a low level of rigidity. In order to reduce the deflection of the rail, the distances between the fastening points on the conveyor are small. External influences, such as wind, must be taken into consideration when dimensioning the rail track.

EP 3 543 179 A1 claims a method that is based on a rail consisting of a T-profile and presents a vehicle adapted for this purpose. The system presented describes at least two running gear pairs that travel on this rail; the exemplary embodiments suggest a vehicle having three running gear pairs which are arranged opposite one another on the web and flange of the profile. However, the described running gear with the rail system has several design-related weaknesses. The rail and its transitions generate shocks when driven over, resulting in an additional loading for the vehicle and the rail. In practice, the profile itself has a low level of rigidity, so that deformations occur due to the running gears and in turn make it difficult to record reproducible data due to fluctuating distances from the measurement object. The vehicle and its components have a centre of gravity above the rail, which leads to high loads on the running gear when cornering or when the rail is discontinuous. When a rail joint is travelled over, a discontinuity results due to the weld seam or the joint gap, which shake the measuring system and possibly damage it; the running gear experiences additional wear and the profile is easily deformed due to the structurally necessary proximity to the conveyor. The requirement to easily remove the rail system for local maintenance and repair work on the conveyor and to assemble and align it again with little effort is not fulfilled in the described method.

It can be summarised that these points have a disadvantageous effect on trouble-free, long-term operation of the diagnostic system and make it difficult to maintain and restart the system.

Another disadvantage of the prior art is the high design effort needed to prevent a derailment of the running gear of the diagnostic system on the profile geometry (L-profile). The systems known for this purpose are prevented from derailing by gravity and by being inserted "from above" into the profile geometry. A single-axis force-fit derailment safety system, without being supplemented with a form-fit or multi-axis force-fit, does not provide adequate operational safety as a result of external system disturbances such as wind or route errors. This leads to considerable effort and loss of confidence on the part of the user because the system either has to be regularly corrected or does not work properly and therefore delivers incorrect results.

The object of the present invention is to overcome the disadvantages in the prior art and to facilitate the fatigue strength, maintainability, assembly and disassembly of the rail system and of the vehicle. To this end, as a track, a rail system is proposed which overcomes these disadvantages. The track should in particular have a high level of rigidity so that deformations due to environmental influences or resulting from a vehicle driving over are low. Another object of the present invention is to propose a running gear which, among other things, can travel on the proposed rail system. The invention focuses on safe driving operation, low wear and the prevention of derailment under all operating conditions. Furthermore, the running gear is intended to be used on existing constructions and, due to its own geometry, to make these usable as a track for new diagnostic applications, such as guardrails on roads. Another object of the present invention is to optimise the interaction between rail system and running gear for trouble-free measurement runs.

The object is achieved by the features of the independent claims. Advantageous embodiments are specified in the dependent claims.

According to a first aspect of the invention, a rail system is proposed as a track for suitable running gears, wherein the track is formed from a closed profile. The rail system has at least one running rail, at least one multi-part track holder and at least one holding element. The running rail is formed as a closed profile and has a passage opening in the longitudinal direction of the profile on at least one end of the profile. The multi-part track holder comprises a running rail support, which is likewise formed as a closed profile.

The holding element of the rail system has a first region and a second region. The first region is arranged in the interior of the running rail support and is preferably fixedly connected thereto. The second region projects at one end of the profile of the running rail support in the longitudinal direction of the profile out of the running rail support and is arranged in the interior of the running rail when the running rail support and the running rail are arranged and/or connected relative to one another in the longitudinal direction with the ends of their profiles, in particular in abutment.

Furthermore, the holding element in the first region and in the second region is formed on a circumference with a first side face, which is arranged in the first region on the inner wall of the running rail support in a highest point of the profile of the running rail support and/or in a portion of the profile of the running rail support tapering against the direction of gravity, i.e. forms there a contact face or at least one contact edge, preferably in the longitudinal direction of the profile of the running rail support, or at least one contact point, and which in the second region, when the running rail support and the running rail are arranged and/or connected relative to one another in the longitudinal direction with the ends of their profiles, in particular in abutment, is arranged on the inner wall of the running rail in a highest point of the profile of the running rail and/or a portion of the profile of the running rail tapering against the direction of gravity, i.e. forms there a contact face or at least one contact edge, preferably in the longitudinal direction of the profile of the running rail, or at least one contact point.

In addition, in the first region, the holding element has a second side face which is formed opposite the first side face on the circumference of the holding element and is arranged on the inner wall of the running rail support, i.e. on the inner wall of the running rail support forms a contact face or at least one contact edge, preferably in the longitudinal direction of the profile of the running rail support, or at least one contact point.

Furthermore, the holding element is formed in the second region with a third side face which is formed opposite the first side face on the circumference of the holding element and is arranged in the passage opening of the running rail or protrudes through the passage opening of the running rail with a parallel offset to the passage opening when the running rail support and the running rail are arranged and/or connected relative to one another in the longitudinal direction with the ends of their profiles, in particular in abutment. For this purpose, the holding element in the second region has a cross-section perpendicular to an insertion direction which runs perpendicular to the longitudinal direction of the running rail support from the first side face to the third side face, which is shaped in a manner complementary to the cross-section of the passage opening of the running rail. Shaped in a complementary manner means that the outer contour of the cross-section of the holding element is shaped identically to the inner contour of the cross-section of the passage opening. The cross-section of the passage opening of the running rail is understood here to mean a cross-section, the surface normal of which runs perpendicular to the longitudinal direction of the profile of the running rail. A cross-section of the holding element perpendicular to the insertion direction is understood to mean a cross-section of the holding element, the surface normal of which runs along or parallel to the insertion direction.

In the rail system according to the invention, the running rail therefore does not have to be connected, as is usual, to the running rail support in the longitudinal direction of the profiles, but can be pushed or inserted perpendicularly to the longitudinal direction of the profiles, for example from above, onto the holding element. This is particularly advantageous if, at the end of the running rail support, little space is available for assembling and disassembling the running rail. Thus, for example, two track holders can be connected to the rail system at a distance of a running rail length by means of a running rail, without having to move or detach the track holders from their installation site for this purpose.

A further advantage of the rail system is the high stability of the track formed therewith. Due to the fact that the first side face is arranged in the highest point or in a portion of the profile tapering upward, and the second and third side faces are arranged opposite one another, the running rail rests on the holding element in these regions in a manner fixed against rotation and with a force-fit. The form-fitting engagement of the holding element and the passage opening fixes the connection additionally. The mutual engagement of the holding element and the passage opening also facilitates the assembly and disassembly of the rail system, since the running rail is guided through the form-fitting connection in the insertion direction, perpendicular to the profile longitudinal direction, wherein a small clearance can also be provided between the passage opening and the holding element for easy handling during assembly and disassembly.

In embodiments of the invention, the holding element can be oriented or arranged vertically or horizontally in the interior of the running rail support, wherein vertically means that the holding element is arranged or oriented in the interior of the running rail support in such a way that the first side face and the second side face are arranged at least in portions vertically one above the other and have a distance which corresponds to the clear height of the profile of the running rail support in the highest point of the profile. Arranged or oriented horizontally means that the holding element is arranged or oriented in the interior of the running rail support in such a way that the first side face and the second side face are arranged horizontally next to one another in the interior of the running rail support, at least in portions, and the first and the third side face are arranged horizontally next to each other in a portion of the profile of the running rail tapering against the direction of gravity, at least in portions, when the running rail support and the running rail are arranged and/or connected relative to one another in the longitudinal direction with the ends of their profiles, in particular in abutment. In the case of a vertical arrangement or orientation, the running rail can thus be inserted or pushed from above, i.e. in the direction of gravity, onto the holding element and rests on the first side face on the holding element, whereas in the horizontal arrangement or orientation, it can be inserted or pushed from the side onto the holding element and rests on the edges of the first and third side faces.

In embodiments of the invention, the second and third side faces of the holding element are formed relative to one another at the transition from the first region to the second region of the holding element with a parallel offset perpendicular to the longitudinal direction of the profile of the running rail support corresponding at least to the width or wall thickness of the profile wall of the running rail. In the second region, the holding element terminates flush with the outer wall of the running rail or projects through the feedthrough of the running rail with an offset perpendicular to the longitudinal direction of the profile of the running rail when the running rail support and the running rail are arranged and/or connected relative to one another at the ends of their profiles in the longitudinal direction, in particular in abutment. Due to the offset of the second and third side faces relative to each other, the holding element has a stop at the transition from the first to the second region, by means of which the holding element can be positioned very easily in the profile end of the running rail support in order to fasten it, for example in the running rail support, in particular to weld it to the profile inner wall. Alternatively or additionally, an opening or a slot on the circumference of the profile of the running rail support, in which the holding element is arranged with a form-fit, can also be provided for positioning the holding element.

Furthermore, an inner profile corner can be provided on the inner wall of the profile of the running rail and/or of the running rail support and is arranged on the inner wall of the profile and has a side face which rests against a surface of the holding element. As a result, the holding element can be more easily positioned in the interior of the profile, for example for welding, and/or the running rail can additionally be secured against slipping out. In the case of a horizontal arrangement of the holding element, the inner profile corner can preferably be arranged above the holding element and can have a side face which rests horizontally against a surface of the holding element when the running rail support (13) and the running rail are arranged or connected relative to one another in the longitudinal direction at the ends of their profiles, in particular in abutment.

In embodiments, the holding element in the first region on the first side face and/or the second side face, or on the contact face, contact edge or contact point formed by the first and/or second side face, is fixedly connected, in particular welded, to the profile of the running rail support on the inner wall of the running rail support.

In embodiments of the invention, the first region and the second region of the holding element are formed in the longitudinal direction of the relevant profiles with a length which corresponds in each case to at least half the maximum inner diameter of the relevant profile.

In a preferred embodiment, the feedthrough of the guide rail is formed as a longitudinal slot which has a constant width in the longitudinal direction of the profile of the running rail. The holding element is formed as a holding plate which, in the second region in the insertion direction, has a sheet metal thickness corresponding to the width of the longitudinal slot. The holding plate can be rectangular. The second and the third side face of the holding plate can each be formed plane-parallel to the first side face. A rail system with a holding plate has the advantage that it can be manufactured with very little effort and can be connected to form a stable track.

In embodiments of the invention, the holding plate can be arranged horizontally in the running rail support. In this arrangement, the guide rail can be inserted or pushed horizontally from the side onto the holding plate and, when the running rail support and the running rail are connected to one another, rests on the first and third side faces or the contact edge formed by the first and third side faces.

In a further embodiment of the invention, the holding plate is arranged vertically in the running rail support, wherein the first side face is arranged on the inner wall of the running rail in a highest point of the profile of the running rail. In this arrangement, the guide rail can be inserted or pushed from above onto the holding plate and, when the running rail support and the running rail are connected to one another, rests on the third side face or the contact edges formed by the third side face. With this arrangement, a particularly stable track can be formed because the holding plate is loaded along its neutral fibre in the direction of gravity.

In embodiments of the invention, the closed profile of the running rail support and the running rail is formed in such a way that it either is round or has n corners, wherein n denotes at least 2 and the corners can be defined mathematically as a discontinuity between the connecting lines, wherein these can be polynomials of n-th order, wherein the profile is described by its neutral fibre. The running rail support of the track holder can be oriented in particular such that the upper and lower points of the running rail support are formed by one corner each of the profile. The upper corner thus forms the highest point at which the first side face can be arranged. Particularly preferably, the profile of the running rail support and the running rail can be formed as a triangular profile or square profile. The running rail thus has a high level of rigidity. Deformations due to environmental influences or due to being driven over by the vehicle are low.

In further embodiments of the invention, the track holder has a web and a fastening device which are fixedly connected to the track holder. The web and the fastening device can be designed to releasably fasten the track holder horizontally to the belt frame of a conveyor. If the holding element is arranged horizontally in the running rail support, the web is arranged on a side of the running rail support on which the second and the third side face of the holding element are also formed.

The fastening device can in particular be a clamping device with a clamping jaw in which the clamping jaw is designed to surround the belt frame of a conveyor in such a way that positioning on the belt frame takes place in the horizontal direction. For this purpose, the clamping jaw can be arranged with at least one fastening means in a horizontally movable manner on a clamping piece of the clamping connection which is fixedly connected to the web of the track holder.

In embodiments of the invention, the multi-part track holder is designed such that it can be arranged on both sides on a conveyor. As a result, it is possible, for example, to allow a diagnostic system to move past the conveyor close to the viewing position on both sides. According to a further aspect of the invention, a running gear is proposed which is suitable for running on the rail system according to the invention. For this purpose, this has at least one two-part system which is also referred to as a guide and drive roller system in accordance with its embodiment in guide and drive system. Furthermore, the running gear comprises at least one chassis that receives and connects the systems and has connection options for sensor system carriers and/or the energy control module. The guide system is formed in such a way that it surrounds the geometry of the track in such a way that it limits the kinematic degrees of freedom to one and omits the holding of the track. This is preferably achieved by the arrangement of guide elements, such as roller, wheel or sliding element, on at least two differently oriented surfaces of a track. Wherein the axes of the connections of the guide system lie in one plane and the axes of the connections of the drive system lie in a further plane which is different from that of the guide system. Thus, only one movement (forward/back) along the track/running rail is provided. The drive system is designed to move the chassis and all connected systems relative to the track. For this purpose, the chassis has connections which are suitable for receiving sensor system carriers and/or energy control module(s) and for positioning them in such a way around a track/running rail at the chassis that the overall centre of gravity of the carrier roller diagnostic system is centred under the track and its geometric centre axis.

The overall centre of gravity of the vehicle should have no or only a small horizontal offset to the running rail. A centre of gravity of the vehicle above the rail is not necessary here and is also not favourable. By means of the targeted arrangement of heavy components, for example of energy control modules(s), the vehicle centre of gravity can be placed under the track. This stabilises the driving system.

The chassis connections for all connectable systems are positioned in such a way that the overall centre of gravity is centred under the track in order to enable an almost symmetrical loading of the guide system and of the track.

This embodiment influences the travel of the driving system with regard to shocks due to an asymmetrical centre of gravity and reduces maintenance due to a lower level of wear. Furthermore, the loading of the track is reduced, which is beneficial for its service life.

The connection options for sensor system carriers are provided in different embodiments, such as protruding above the inspection object, for example with a framework which extends over a conveyor in order to inspect the conveyor belt. Furthermore, connection options can be provided directed downwards, that is to say under the chassis, specifically can be arranged in front of and behind, as well as close to the chassis sensor system carrier. The energy control module(s) are preferably to be arranged so as to be oriented thereon below the track and the chassis, so that the overall centre of gravity can be positioned optimally, as described above.

This solution enables the reduction of guide elements with simultaneous limitation of the degrees of freedom and better maintainability of the running gear compared to the prior art. The separate arrangement of the guide and drive system enables a simple and robust construction with the possibility of varying the two systems in their respective embodiments or combining a plurality of systems. The guide system is formed in such a way that the individual elements are arranged symmetrically along the longitudinal axis, so as to be spaced apart around the rail system in the longitudinal axis, that is to say offset. In this way, elements in the guide system can be spared; the degrees of freedom remain limited by the longitudinal connection via the chassis.

In the sense of the present application, the longitudinal axis is to be understood as the axis in which the running gear extends on the rail system or in the direction of travel. The transverse axis is oriented at a right angle to the longitudinal axis in the same plane and the height axis is perpendicular to this plane and the axes located therein.

In embodiments of the invention, the chassis is provided with joints which enable narrow radii for cornering or abrupt steep rises without tensioning the guide system against the track.

This embodiment thus allows the arrangement of, for example, a joint between two guide element planes, and for this purpose the joints can allow a compensation or a directional tilt in the height axis, the transverse axis and minimally in the longitudinal axis. As a result, either larger gradients/inclinations of tracks can be travelled over, or narrower cornering or damping of accelerations is possible. A combination of several joints/compensation elements can also be realised.

In embodiments of the invention, the chassis is designed such that it almost completely surrounds the track in order to enable a travelling via the multi-part track holders.

The running gear is designed such that it engages around the rail/rail system and does not protrude into it. The force vectors/torque reference points of the running gear are thus at the same distance from a centre point, which ensures low loading and wear.

In embodiments of the invention, the guide system is provided with rollers which are preferably arranged in pairs and are arranged on at least two opposite positions of the track.

In embodiments of the invention, the rollers of the guide system are arranged such that they rest on at least four points or lines of the track. The rollers are expediently to be arranged symmetrically on the track and do not run in the same plane, wherein these roller pairs are arranged symmetrically at the same distance/radius from the rail centre point or the track centre axis, preferably on a circle about the rail centre point or the track centre axis.

This design allows a stable driving position while using few components; the four-point or linear support preferably rules out derailment on the rail system according to the invention or a comparable system. In addition, the force effect is symmetrical on the rail and inside the vehicle. This positively influences the wear and the service life, as well as the measurement run.

In embodiments of the invention, the rollers of the guide system are variable in diameter; preferably the diameters are selected such that no shock is caused when rail joints are travelled over. The measuring system is thus uninfluenced by these.

In embodiments of the invention, the drive system is preferably formed from rollers and each of the rollers is designed to carry out a dual line touching, double line touching, or two-line contact on the track.

This design offers the advantage that the force per roller or wheel is transmitted better as a result of more contact area, which is conducive to a uniform and quiet journey, which in turn improves the sensor data because the measurement errors are reduced. This design is suitable in particular for the conditions in opencast mining and transport of bulk goods, since the forces acting here during the transport of ore, coal and the like cause shocks and conduct vibrations in the track, which, in the systems known to date, have a disadvantageous effect on the fatigue strength, driving stability and the measurements.

In embodiments of the invention, the drive system has at least one drive unit, such as hub-driven wheels or gear wheels.

These drive units can be combined within the drive system in order to travel, for example, on certain rail portions, although the actual primary drive unit is not intended for this purpose.

In embodiments of the invention, the rollers of the guide system are provided with coatings and/or special surface structures that change the coefficient of friction. Thus, for example, terrain gradients without additional drive systems or cornering with cant are possible, with the driving system remaining directionally stable.

In embodiments of the invention, the drive system is to be positioned so far up on the track by the position in the chassis that it is held in engagement by gravity.

As a result of this arrangement above and on the track and the force of gravity to keep the drive system engaged, the material is protected. In the event of disturbances on the track, the drive system cannot be damaged, but is lifted out of contact. As a result of the lifting, there is no drive for a short time, but due to the inertia of the system it drives over the fault and then comes into engagement again by gravity and drives again. This lifting also takes place in the case of gradient transitions in the track, thus reducing the load and fault sources.

In embodiments of the invention, the drive system is supplemented with an elastic mechanism, so that the drive still remains in contact for a short time or is not damaged as a result of discontinuity in the track.

The elastic mechanism acts like a damper or/and a spring and prevents the drive system from oscillating on the track as a result of discontinuities. Furthermore, it can bring about a permanent restoring force which, in the case of gear drive, keeps the drive system in engagement, thus preventing wear due to permanently incorrect engagement normals.

In embodiments of the invention, a combination of a guide system or a drive system with the respective other system is possible.

This variant is a type of special form or hybrid which is used for track geometries which cause a structural collision of the systems. In these cases, the guide system can take on drive tasks or the drive system can take on guide tasks. For example, in the case of triangular geometries, in which a surrounding wheel with a flange is used on the corner(s), which, among other things, drives on one upper corner, an additional drive system would not be feasible due to a lack of space.

In embodiments of the invention, receptacles for the sensor system can be provided at almost any position of the chassis.

Depending on the requirements of the sensor system, for example, an overhanging arm can be attached in such a way that it can be used to look at the belt of a conveyor from above, or downwards, in order to be able to inspect the free belt for damage. It is also conceivable to attach identical sensors to the chassis at the front and rear in order to thus provide a redundant measuring system with error correction. The chassis receptacles are thus adaptable to the application requirements in principle and are not limited to an upper position.

In embodiments of the invention, the receptacle positions of the sensor system on the chassis are arranged such that the sensors detect the rollers and/or belt and/or bearings. For example, in the case of belt conveyors, the receptacle positions for the sensor system on the chassis can be selected such that the sensor system can be oriented from above towards the belt, from the side towards the rollers and the bearings thereof, and from below towards drives or belts. Preferably, the sensors are arranged in such a way that they have a defined/favourable angle with respect to the object being viewed.

In embodiments of the invention, the energy control module is preferably arranged under the track on the chassis. This position enables a better compensation for the overall centre of gravity if the sensor system protrudes to a great extent upwards and or laterally. Due to the higher inherent mass of the module, it is favourable for the driving properties if this is arranged to be low.

The preferably low position also has a positive effect on the driving properties because the downwardly directed inertia of the vehicle reduces jumping as a result of discontinuities or disturbances and thus increases the driving stability.

In embodiments of the invention, the energy control module can also be provided to be divisible in order to make the inherent mass and or the use of installation space uniform around the track in the case of a structurally limited application.

In the case of longer chassis with overhanging measuring systems or chassis coupled multiple times, this division is appropriate because the masses can be distributed and the system as a whole puts an almost constant and lower load on the track. Thus, tracks which appear unsuitable for large and heavy driving systems can then be assessed as suitable due to the linear distribution and point load reduction.

Figure 2:
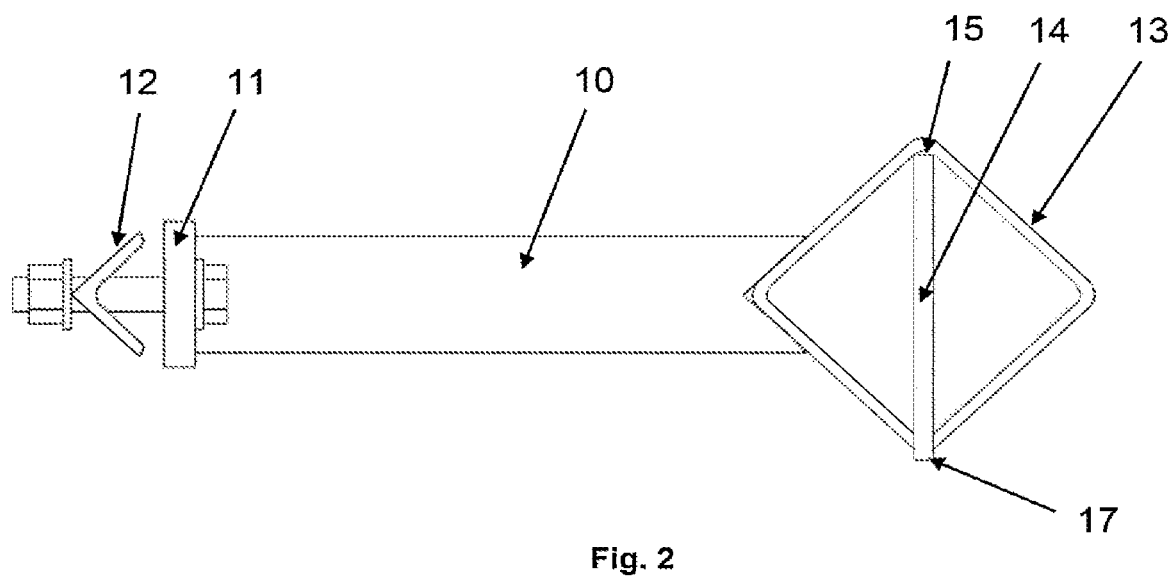
Figure 3:
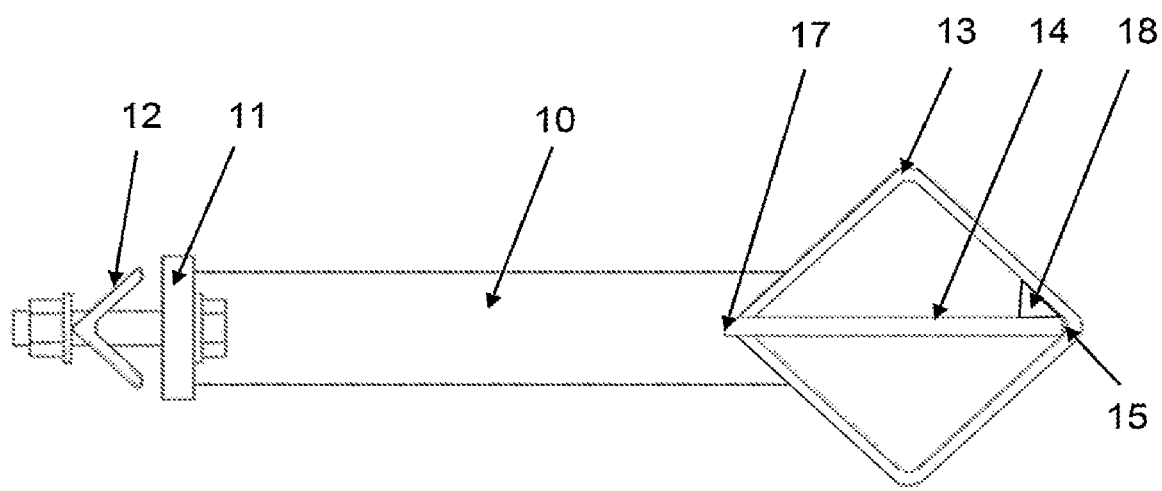
Figure 4:
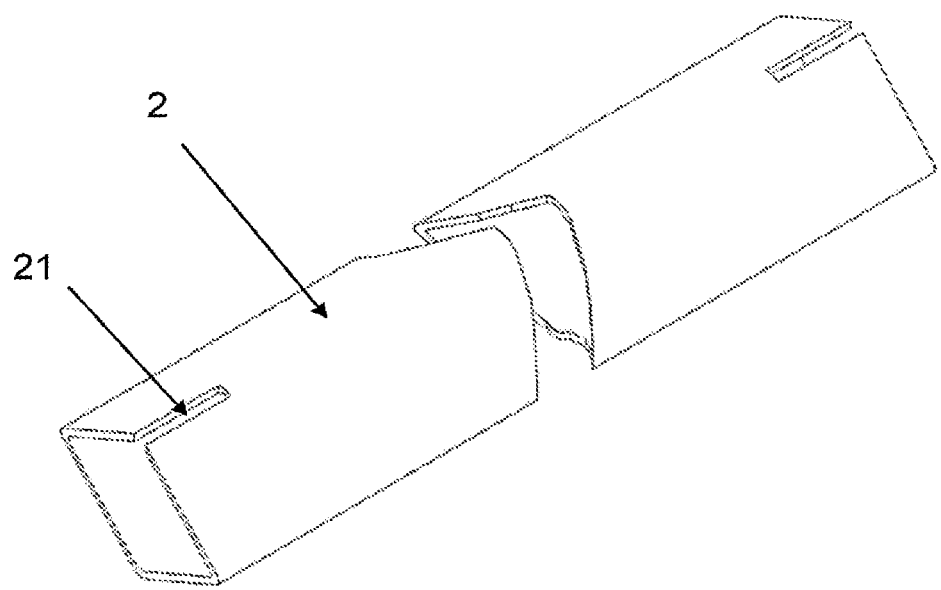
Figure 5:
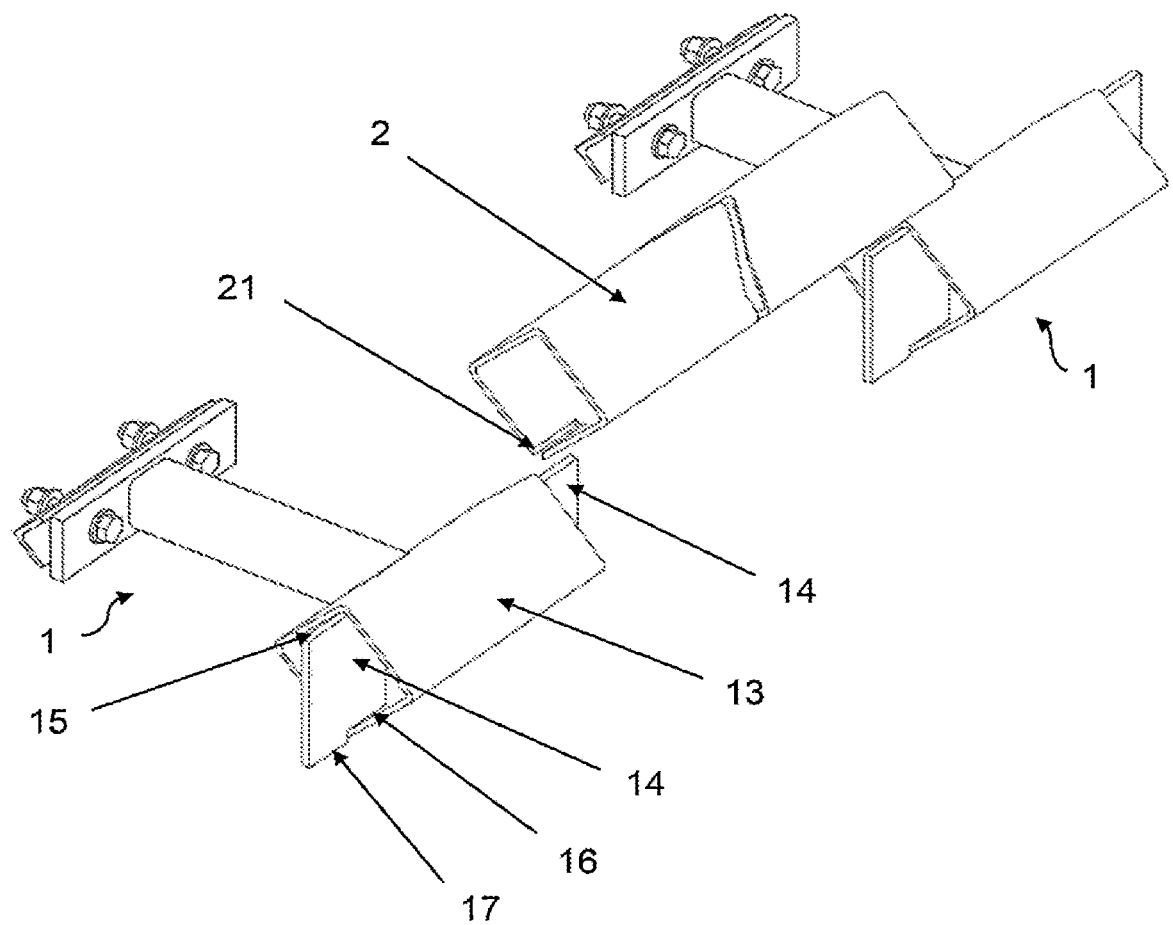
Figure 6:
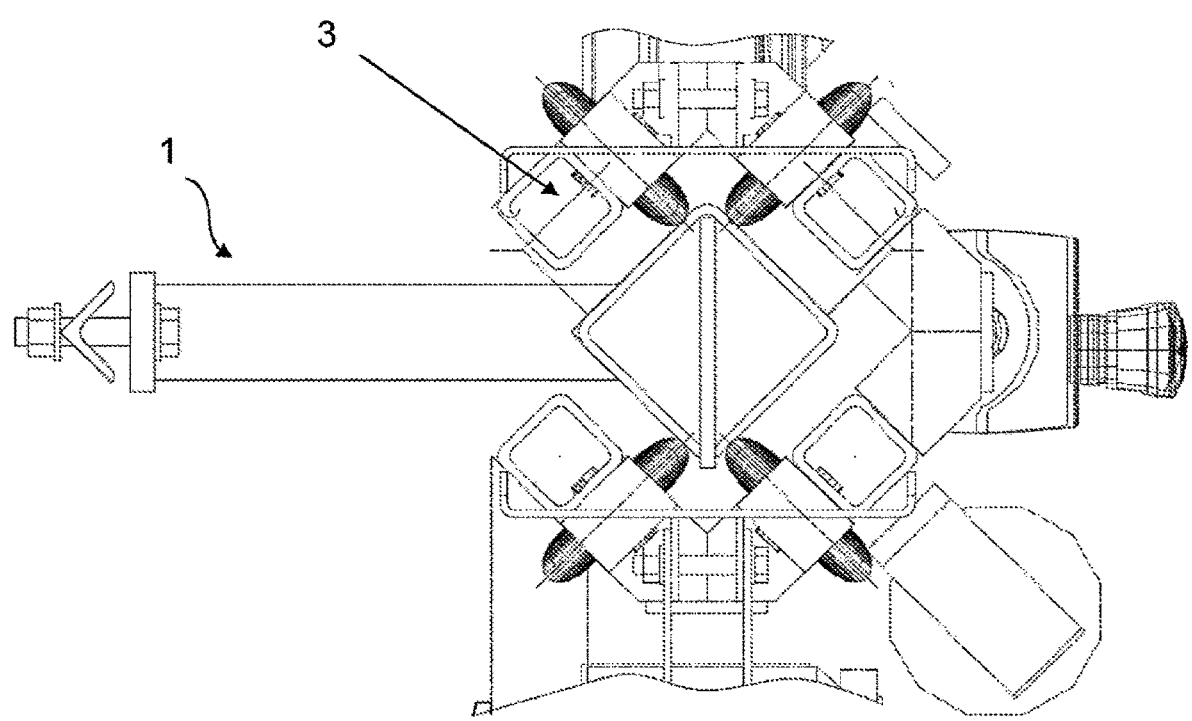

The invention is explained in more detail below with reference to a number of exemplary embodiments and associated figures. The exemplary embodiments are intended to describe the invention without limiting it. In the drawings:

FIG. 1 shows a schematic view of a track holder with a holding element, as a base, in a three-dimensional view; in FIG. 2 shows a schematic view of a track holder with a holding element in a side view; in FIG. 3 shows a schematic view of a further track holder with holding element in a three-dimensional view; in FIG. 4 shows a schematic view of a running rail in a three-dimensional view; in FIG. 5 shows a schematic view of a rail system with track holders, holding elements and running rail in a three-dimensional view; in FIG. 6 shows a schematic view of a running gear and contacts thereof to the rail system with a track holder detail in a sectional view.

In a first exemplary embodiment, FIG. 1 shows a schematic representation of a multi-part track holder (1) of a rail system with at least one holding element (14) in a three-dimensional view. The same features are denoted in this case as well as in the following figures with the same reference signs. FIG. 1 shows a possible design of a track holder with its base elements. Here, the track holder (1) comprises a running rail support (13) which is formed from a closed profile, and a holding element (14) which has a first region (A) and a second region (B). The first region (A) is arranged in the interior of the running rail support (13). The holding element (14) can be releasably fastened in the interior of the running rail support, for example inserted into the profile, or preferably connected fixedly to the running rail support (13) in the first region (A), for example welded, press-fit, clamped or wedged. The second region (B) projects at one end of the profile of the running rail support (13) in the longitudinal direction of the profile from the running rail support (13) and is designed in such a way that it is arranged in the interior of a running rail (not shown) as soon as the running rail support (13) and the running rail with the ends of their profiles are arranged or connected relative to one another in the longitudinal direction, in particular in abutment. The second region (B) is thus designed such that it can be arranged in the interior of the profile of a running rail.

Furthermore, the holding element (14) in the first region (A) and in the second region (B) is formed with a first side face (15), which is arranged in the first region (A) on the inner wall of the running rail support (13) in a highest point of the profile of the running rail support and/or in a portion of the profile of the running rail support (13) tapering against the direction of gravity, i.e. forms there a contact face or at least one contact edge, preferably in the longitudinal direction of the profile of the running rail support (13), or at least one contact point, and which in the second region (B) is designed such that, when the running rail support (13) and the running rail (not shown) are arranged or connected relative to one another in the longitudinal direction with the ends of their profiles, in particular in abutment, it is arranged on the inner wall of the running rail in a highest point of the profile of the running rail and/or a portion of the profile of the running rail tapering against the direction of gravity, i.e. forms there a contact face or at least one contact edge, preferably in the longitudinal direction of the profile of the running rail, or at least one contact point.

In addition, the holding element (14) is formed in the first region (A) with a second side face (16) (concealed in the figure by the running rail support) which is formed opposite the holding element (14) of the first side face (15) and is arranged on the inner wall of the running rail support (13), i.e. forms a contact face or at least one contact edge, preferably in the longitudinal direction of the profile of the running rail support (13), or at least one contact point on the inner wall of the running rail support.

Furthermore, the holding element (14) is formed in the second region (B) with a third side face (17) which is formed opposite the holding element (14) of the first side face (15) and is designed such that it is arranged in the passage opening of the running rail (not shown) or projects through the passage opening of the running rail with a parallel offset to the passage opening when the running rail support (13) and the running rail are arranged or connected relative to one another in the longitudinal direction at the ends of their profiles, in particular in abutment. For this purpose, the holding element in the second region (B) has a cross-section perpendicular to an insertion direction which runs perpendicular to the longitudinal direction of the running rail support (13) from the first side face (15) to the third side face (17), which is shaped in a manner complementary to the cross-section of the passage opening of the running rail. The outer contour of the cross-section of the holding element (14) is therefore formed to be congruent with the inner contour of the cross-section of the passage opening, wherein the cross-section of the passage opening is understood to mean a cross-section, the surface normal of which runs perpendicular to the longitudinal direction, i.e. perpendicular to the longitudinal axis, of the running rail, and a cross-section of the holding element (14) perpendicular to the insertion direction is understood to mean a cross-section, the surface normal of which runs along or parallel to the insertion direction.

As a result, the holding element (14) engages in a form-fitting manner in the passage opening of the running rail when the running rail support (13) and the running rail are connected to one another. Since the cross-section of the holding element (14) in the entire second region (B) is designed to be complementary to the passage opening of the running rail in the insertion direction, the passage opening also serves as a guide aid and thus facilitates the assembly or disassembly of the rail system.

The second side face (16) and the third side face (17) are formed relative to one another at the transition from the first region (A) to the second region (B) with a parallel offset perpendicular to the longitudinal direction of the profile of the running rail support (13), i.e. along the insertion direction, wherein the offset corresponds to at least the width of the profile wall of the running rail, so that the holding element (14) in the second region (B) is flush with the outer wall of the running rail (not shown) or projects through the passage opening of the running rail with an offset perpendicular to the longitudinal direction of the profile of the running rail when the running rail support (13) and the running rail are arranged relative to one another in the longitudinal direction with the ends of their profiles, in particular in abutment. Alternatively or in addition to an offset, an opening or groove can also be provided on the circumference of the running rail support (13) in the longitudinal direction of the profile of the running rail support (13), in which opening or groove the holding element (14) is arranged in order to be positioned in a manner fixed against rotation in the running rail support (13), for example for welding.

In the example of FIG. 1, the holding element (14), as also shown in the example of FIG. 2, is arranged vertically in the running rail support (13) with its first region (A), i.e. the holding element (14) is arranged in the interior of the running rail support (13) such that the first side face (15) and the second side face (16) are arranged at least in portions vertically one above the other and have a distance which corresponds to the clear height of the profile, i.e. the inner diameter, of the running rail support (13) in the highest point of the profile. The insertion direction therefore runs vertically. Alternatively, the holding element (14) can also be arranged with its first region (A), as shown in FIG. 3, horizontally in the running rail support (13), i.e. can be arranged in the interior of the running rail support (13) such that the first side face (15) and the second side face (16) are arranged horizontally next to each other at least in portions in the interior of the running rail support (13) and the insertion direction runs horizontally.

The holding element (14) of the exemplary embodiment in FIG. 1 is formed as a holding plate which, in the second region (B), has a sheet metal thickness which corresponds to the width of the passage opening in the running rail (not shown), wherein the passage opening is formed as a longitudinal slot which has a constant width in the longitudinal direction of the profile of the running rail. In the example, the holding element (14) is formed with a rectangular basic shape and side faces that are plane-parallel to one another. The running rail and the holding element (14) can thus be manufactured without great effort and can be connected to one another in a particularly simple manner to form a track by inserting or pushing the running rail onto the holding element (14) in the insertion direction, perpendicular to the longitudinal direction of the profile of the running rail support (13). However, holding elements (14) with other form-fitting cross-sectional geometries of the second region (B) and the passage opening of the running rail perpendicular to the insertion direction are also possible. The various side faces of the holding element (14) can also be adapted in their cross-sectional contour to curved inner walls of the profiles of the running rail support (13) or the running rail (2). In addition, an offset parallel to the insertion direction can also be provided for the first side face (15) in the transition between the first region (A) and the second region (B) in order to connect profiles with different inner diameters or wall thicknesses to one another.

The profile of the running rail support (13) and the running rail (2) is formed as a square hollow profile in the example shown in FIG. 1. However, it can also be formed as a round profile or can be configured such that it has n corners, wherein n denotes at least 2 and the corners can be defined mathematically as a discontinuity between the connecting lines, wherein this can be polynomials of n-th order, wherein the profile is described by the neutral fibre. In the case of an n-cornered profile, the running rail support (13), as shown in FIG. 1, can be oriented such that the upper and lower points of the running rail support (13) are formed by one corner each of the profile. The upper corner of the profile thus forms the highest point in which the first side face (15) of the holding element (14) is arranged.

As shown in the example of FIG. 1, the track holder (1) can further comprise a web (10) and a fastening device (11, 12) which is designed to releasably fasten the track holder (1) to the belt frame of a conveyor. The fastening device (11, 12) can be designed as a clamping device and can have a clamping jaw (11) which is designed to surround the belt frame of the conveyor in such a way that positioning on the belt frame takes place in the horizontal direction.

In further exemplary embodiments, in FIG. 2 and FIG. 3, a side view of a track holder (1) with a holding element (14) from a viewing direction in the longitudinal direction, i.e. along the longitudinal axis, of the profile of the running rail support (13) is shown in each case. In FIG. 2, the holding element (14) is arranged or oriented vertically in the running rail support (13), in FIG. 3 it is arranged or oriented horizontally in the running rail support (13). The running rail (not shown) can thus be inserted or pushed from above onto the holding element (14) in the example of FIG. 2 and, in the example of FIG. 3, can be inserted or pushed laterally, perpendicular to the longitudinal direction of the profiles, onto the holding element (14). In the vertical arrangement, the running rail rests on the first side face (15) or the contact edges thereof with the holding element (14). In the horizontal arrangement, the running rail rests on the first side face (15) and the third side face (17) or the contact edges thereof on the holding element (14), wherein the first side face (15) is arranged in a portion of the running rail tapering against the direction of gravity, so that the running rail does not slip downwards during the assembly process. The profile of the running rail and/or of the running rail support (13) can moreover have an inner profile corner (18) which is arranged on the inner wall of the profile and has a side face which rests against a surface of the holding element (14). As a result, the holding element (14) can be more easily positioned in the interior of the profile and/or the running rail can additionally be secured against slipping out. In the case of a horizontal arrangement of the holding element (14), the inner profile corner (18) can preferably be arranged over the holding element (14), i.e. above the holding element (14), and can have a side face which, as shown in FIG. 3, rests horizontally against a surface of the holding element (14) when the running rail support (13) and the running rail are arranged or connected relative to one another in the longitudinal direction at the ends of their profiles, in particular in abutment.

In a further exemplary embodiment, a three-dimensional view of a running rail (2) of a rail system rotated through 180° or 90° about the longitudinal axis in comparison with a possible installation position is shown in FIG. 4. The running rail (2) is designed as a closed profile and has a passage opening (21) on at least one end of the profile on the circumference of the profile in the longitudinal direction of the profile. This passage opening (21) serves to guide the holding element (14) during the assembly or disassembly of the rail system and provides the rail system with stability by form-fitting engagement of the holding element (14) and the passage opening (21) when the running rail support and the running rail (2) are arranged or connected relative to one another in the longitudinal direction with the ends of their profiles, in particular in abutment. In the example shown, the passage opening (21) is designed as a longitudinal slot which has a constant width in the longitudinal direction of the profile of the running rail (2). However, other cross-sectional geometries of the passage opening (21) are also possible. As shown, the passage opening (21) can be arranged in a corner of the profile of the running rail (2). For a vertical arrangement of the holding element (14), the passage opening (2) can be arranged in a point or a corner which, when the running rail support and the running rail (2) are arranged or connected relative to one another in the longitudinal direction with the ends of their profiles, in particular in abutment, form a lowest point or a lower corner of the running rail (2). For a horizontal arrangement of the holding element (14), the passage opening (21) can also be arranged in a corner of the profile of the running rail (2) and/or in a portion or cross-section of the profile of the running rail (2) tapering against the direction of gravity. However, since the running rail (2) is supported with the third side face (17) on or in the passage opening (21) in a horizontal arrangement of the holding element (14), other arrangements of the passage opening (21) in the running rail (2) are also possible, for example in a region of the running rail (2), the inner wall of the profile of which is arranged vertically or is oriented at an angle in the installed state.

In the exemplary embodiment of FIG. 5, a three-dimensional view of a rail system with track holders (1), holding elements (14) and running rails (2) is shown. This illustration is shown as an exploded view which is intended to show that the running rail support (13) of the track holder (1) has the same cross-section as the running rails (2), which ensures a trouble-free driving over of a suitable diagnostic system. FIG. 5 additionally illustrates that two track holders (1) can be connected to the rail system by means of a running rail (2) by inserting the running rail (2) onto the holding elements (14) of the track holders (1) without having to move the track holders (1) or release them from their installation site. As shown, the track holders (1) can be formed with a holding element (14) at each end of the profile of the running rail support (13). The track holder (1) can thereby be connected on both sides to running rails (2) to form a rail system. The rail system can therefore also comprise more than two running rail holders (13).

In the exemplary embodiment shown, the profiles of the running rail support (13) and of the running rail (2) can be connected to one another in abutment, i.e. in a direct contact, in particular congruently, to form a track. For the compensation of thermal stresses or for damping of shocks or vibrations, however, compensation or damping elements can also be provided in the rail system and are designed to be arranged between the running rail support (13) and the running rail (2). The elements can be formed in their shape analogously to the running rail support (13) or the running rail (2), so that the holding element (14) is arranged with its first region (A) or second region (B) in the elements, wherein the region in question is extended by at least the length of the compensation element in the longitudinal direction of the profiles. In particular, the elements can also have a passage opening (21) or a longitudinal slot on their entire length, so that they can also be inserted onto the holding element (14).

FIG. 6 shows a schematic view of an exemplary embodiment of a running gear (3) and its contacts to the rail system with the track holder cut-out (1) in a sectional view. In the illustration, the running gear (3) is inserted on the running rail (2) of the rail system, as a result of which it becomes clear in which regions of the rail system the rollers of the running gear (3) run and that the running gear geometry passes over the discontinuities in the region of the track holder (1) without promoting derailment.

REFERENCE SIGNS

1 Track holder, multi-part
2 Running rail, rail system
3 Running gear
10 Web
11 Clamping piece of the fastening device
12 Clamping jaw of the fastening device
13 Running rail support/rail support
14 Holding element
15 First side face of the holding element 14
16 Second side face of the holding element 14
17 Third side face of the holding element 14
18 Inner profile corner
21 Passage opening of the running rail 2
A First region of the holding element 14
B Second region of the holding element 14

The invention claimed is:

1. A rail system comprising:
at least one running rail (2) which is designed as a closed profile and has a passage opening (21) in a longitudinal direction of the profile on at least one end of the profile on a circumference of the profile,
at least one multi-part track holder (1) having a running rail support (13) which is designed as a closed profile,
at least one holding element (14) which has a first region (A) and a second region (B), wherein the first region (A) is arranged in the interior of the running rail support (13) and the second region (B) protrudes from the running rail support (13) at one end of the profile of the running rail support (13) in the longitudinal direction of the profile and is arranged in the interior of the running rail (12) when the running rail support (13) and the running rail (2) are arranged relative to one another with the ends of their profiles in the longitudinal direction, and
the holding element (14) has a first side face (15) in the first region (A) and in the second region (B) on the circumference, which first side face is arranged in the first region (A) in a highest point of the profile of the running rail support (13) and/or a portion of the profile of the running rail support (13) tapering against the direction of gravity on the inner wall of the running rail support (13), and is arranged in the second region (B) in a highest point of the profile of the running rail (2) and/or a portion of the profile of the running rail (2) tapering against the direction of gravity on the inner wall of the running rail (2), when the running rail support (13) and the running rail (2) are arranged relative to one another in the longitudinal direction with the ends of their profiles, and
the holding element (14) has a second side face (16) in the first region (A), which second side face is formed opposite the circumference of the holding element (14) of the first side face (15) and is arranged on the inner wall of the running rail support (13), and
the holding element (14) has a third side face (17) in the second region (B), which third side face is formed on the circumference of the holding element (14) opposite the first side face (15), and, when the running rail support (2) and the running rail (12) are arranged relative to one another in the longitudinal direction with the ends of their profiles, is arranged in the passage opening (21) of the running rail (2) or projects through the passage opening (21) of the running rail (2) with parallel offset perpendicular to the longitudinal direction of the profile of the running rail support (13), and
the holding element (14) in the second region (B) has a cross-section perpendicular to an insertion direction which runs perpendicularly to the longitudinal direction of the running rail support (13) from the first side face (15) to the third side face (17), wherein the cross-section is shaped in a manner complementary to the cross-section of the passage opening (21) of the running rail (2).

2. The rail system according to claim 1, wherein the holding element (14) is arranged in the interior of the running rail support (13) in such a way that the first side face (15) and the second side face (16) are arranged at least in portions vertically one above the other and have a distance which corresponds to the clear height of the profile of the running rail support (13) in the highest point of the profile of the running rail support (13).

3. The rail system according to claim 1, wherein the holding element (14) is arranged in the interior of the running rail support (13) in such a way that the first side face (15) and the second side face (16) are arranged horizontally next to each other at least in portions in a portion of the profile of the running rail support (13) tapering against the direction of gravity, and/or the first side face (15) and the third side face (17) are arranged horizontally next to each other at least in portions in a portion of the profile of the running rail (13) tapering against the direction of gravity.

4. The rail system according to claim 1, wherein the second side face (16) and the third side face (17) are formed relative to one another at the transition from the first region (A) to the second region (B) with a parallel offset perpendicular to the longitudinal direction of the profile of the running rail support (13), wherein the offset corresponds to at least the width of the profile wall of the running rail (2).

5. The rail system according to claim 1, wherein the passage opening (21) of the running rail (2) is formed as a longitudinal slot which has a constant width in the longitudinal direction of the profile of the running rail (2) and the holding element (14) is formed as a holding plate which has a sheet metal thickness in the second region (B) corresponding to the width of the longitudinal slot.

6. The rail system according to claim 1, wherein the closed profile of the running rail support (13) and of the running rail (2) is formed in such a way that it has n corners, wherein n is at least 2 and the corners can be defined mathematically as a discontinuity between the connecting lines, wherein these can be polynomials of n-th order, wherein the profile is described by the neutral fibre.

7. The rail system according to claim 6, wherein the running rail support (13) of the track holder (1) is oriented such that the upper and lower points of the running rail support (13) are formed by one corner each of the profile.

8. The rail system according to claim 1, wherein the track holder (1) has a web (10) and a fastening device (11,12) which is designed to releasably fasten the track holder (1) to the belt frame of a conveyor.

9. The rail system according to claim 8, wherein the fastening device (11,12) is formed as a clamping device and has a clamping jaw (11) which is designed to surround the belt frame of the conveyor in such a way that positioning on the belt frame takes place in the horizontal direction.

10. The rail system according to claim 2, wherein the second side face (16) and the third side face (17) are formed relative to one another at the transition from the first region (A) to the second region (B) with a parallel offset perpendicular to the longitudinal direction of the profile of the running rail support (13), wherein the offset corresponds to at least the width of the profile wall of the running rail (2).

11. The rail system according to claim 3, wherein the second side face (16) and the third side face (17) are formed relative to one another at the transition from the first region (A) to the second region (B) with a parallel offset perpendicular to the longitudinal direction of the profile of the running rail support (13), wherein the offset corresponds to at least the width of the profile wall of the running rail (2).

\* \* \* \* \*